United States Patent [19]

Snitzer

[11] 4,044,315
[45] * Aug. 23, 1977

[54] MEANS FOR PRODUCING AND AMPLIFYING OPTICAL ENERGY

[75] Inventor: Elias Snitzer, Brookfield, Mass.

[73] Assignee: American Optical Corporation, Southbridge, Mass.

[*] Notice: The portion of the term of this patent subsequent to Apr. 24, 1990, has been disclaimed.

[21] Appl. No.: 168,012

[22] Filed: Jan. 16, 1962

[51] Int. Cl.² ............................................. H01S 3/16
[52] U.S. Cl. ............................ 331/94.5 F; 252/301.18
[58] Field of Search ...................... 88/10 M; 331/94.5; 252/301.1; 330/4.3

[56] References Cited

U.S. PATENT DOCUMENTS

| | | | |
|---|---|---|---|
| 3,032,428 | 5/1962 | Ginther | 106/47 |
| 3,079,347 | 2/1963 | Garrett et al. | 252/301.4 |
| 3,147,225 | 9/1964 | Ryan | 252/301.1 |
| 3,183,193 | 5/1965 | Soden et al. | 252/301.5 |

OTHER PUBLICATIONS

Gandy et al., Proc. IRE, vol. 50, No. 10 (Oct. 1962), pp. 2113–2114.

*Primary Examiner*—William L. Sikes
*Attorney, Agent, or Firm*—William C. Nealon

[57] ABSTRACT

1. In a laser, a solid luminescent sensitive element of Fabrey-Perot optical regenerative configuration and consisting essentially of a clear glass activated with trivalent ytterbium ions.

42 Claims, 13 Drawing Figures

INVENTOR
ELIAS SNITZER

INVENTOR
ELIAS SNITZER
BY
ATTORNEYS

INVENTOR.
ELIAS SNITZER

MEANS FOR PRODUCING AND AMPLIFYING OPTICAL ENERGY

This invention relates generally to optical masers, or lasers as they are sometimes called, and related light-generating and light-amplifying devices.

The word laser is being used in the instant disclosure in preference to maser since devices and components of this invention are used in the light or optical region of the electro-magnetic spectrum rather than in the microwave region thereof; it being appreciated, of course, that the name "MASER", now in common use, was originally derived from the initials of the title Microwave Amplification by Stimulated Emission of Radiation. With the word LIGHT substituted for MICROWAVE, the word "MASER" becomes "LASER". Accordingly, the terms optical maser and laser as used herein are equivalents.

More particularly, the invention relates to improvements in laser devices and components employing special glasses, utilizing known glass compositions in which suitable maser materials are incorporated or confined, as the laser materials and which devices and components because of their composition and construction are able to provide new and improved operating conditions and efficiencies not previously obtained by any optical maser or laser or equivalent devices of known constructions.

The broad general principles of operation of optical masers, or lasers, are well-known, and several different solid state laser materials, for example natural or artificial rubies, have already been discovered. It should be appreciated, however, that each of these earlier solid state laser materials has been a crystalline material and, accordingly, each has been accompanied by limitations as to its construction, operative abilities, response characteristics and the like, as will appear from the description which follows.

It has now been found that a laser material or laser component may be formed from any one of a plurality of specially prepared glasses or glassy materials and when properly made and operated will provide new operating results not heretofore obtainable by any known laser material or device.

The terms "glass" and "glassy material" as used in their broader senses throughout this disclosure, it should be noted, are intended to include both organic and inorganic rigid materials which are of a plastic-like nature having a non-periodic atomic structure, as distinguished from materials having their atoms in an orderly periodic array, and would include not only commercially available inorganic glasses such as soda-lime glass, barium crown glass, flint glass, lead glass, arsenic trisulphide glass and the like but also certain commercially available organic transparent plastics, glycerine and other vitrified sugar substances, and mixtures of organic solutions which, when cooled, form clear glasses such as E.P.A. (ether, isopentane and alcohol)

In fact, it has been found that when a suitable active material such as any one of certain materials selected from the rare earth group or other specified materials is combined with such a glass and used in the manner hereinafter disclosed, advantageous results in light generation and coherent light amplification will be obtained. The term "light" as herein used is intended to cover the approximate wave length range from about $2 \times 10^3$ Angstroms to about $10 \times 10^6$ Angstroms.

Several different crystalline solid state laser materials including red ruby, pink ruby, divalent samarium in calcium fluoride, trivalent uranium in barium fluoride and trivalent uranium in calcium fluoride have already been discovered and used to demonstrate lasering action. It should be noted, however, that each of these laser materials is in the form of a single crystal and, accordingly, is very much limited in size, with the result that even though laser action or the like has been obtained therewith under certain operative conditions, nevertheless, the performance and possible uses of these materials are limited.

On the other hand, by following the teachings of the present invention wherein a specially prepared glass or glassy material embodying or confining suitable active or laser materials therein are provided, it is possible to obtain results not obtainable by any of the solid state laser materials mentioned above. For example, laser components formed of glass may be compounded and worked or shaped in many different known ways and techniques. Furthermore, such new glass laser materials may be produced in large volume and be formed into thin, long rods or fibers and easily controlled as to exact thickness and cross-sectional shape, or molded into preferred resonant cavity shapes or the like, thereby making it possible to obtain many new results and advantages, later to be more fully described, and which results and advantages were not obtainable by any of the earlier known solid state laser materials.

It is, accordingly, an object of the present invention to provide novel laser components, laser devices, laser assemblies and the like comprising a specially prepared glass embodying a suitable predetermined amount of laser material.

It is an additional object of the invention to provide a laser component and the like of the character described and which component is formed of glass embodying an acitve laser ingredient selected from the group including Praseodymium+++, Neodymium+++, Samarium++, Samarium+++, Europium++, Europium+++, Uranium+++, Terbium+++, Holmium+++, Erbium+++, Thulium+++, Dyprosium+++, Ytterbium+++, and Cerium+++, and which laser component may be readily formed into a suitable predetermined shape so as to efficiently function in a predetermined manner as a laser oscillator or as a light amplifier.

Another object of the invention is to provide a laser component formed of glass and comprising an ingredient selected from the above-mentioned group and with the weight of said ingredient being between 0.01 and 30% of the weight of said glass.

It is also an object of the invention to provide a resonant cavity laser or the like formed of glass and of such construction as to have a high quality factor or Q for the laser oscillations.

Another object of the invention is to provide laser means formed of glass and so constructed and arranged as to function as a travelling wave type of laser amplifier, such as might be used with a communication system using optical energy as the signal.

It is also an object of the invention to provide laser means formed of glass and arranged so as to function as a broad band amplifier for signals in the optical region of the spectrum.

Other objects and advantages of the invention will become apparent from the detailed description which follows when taken in conjunction with the accompanying drawings in which.

Figures 1, 2, 3, 4, 5, 6, 8:
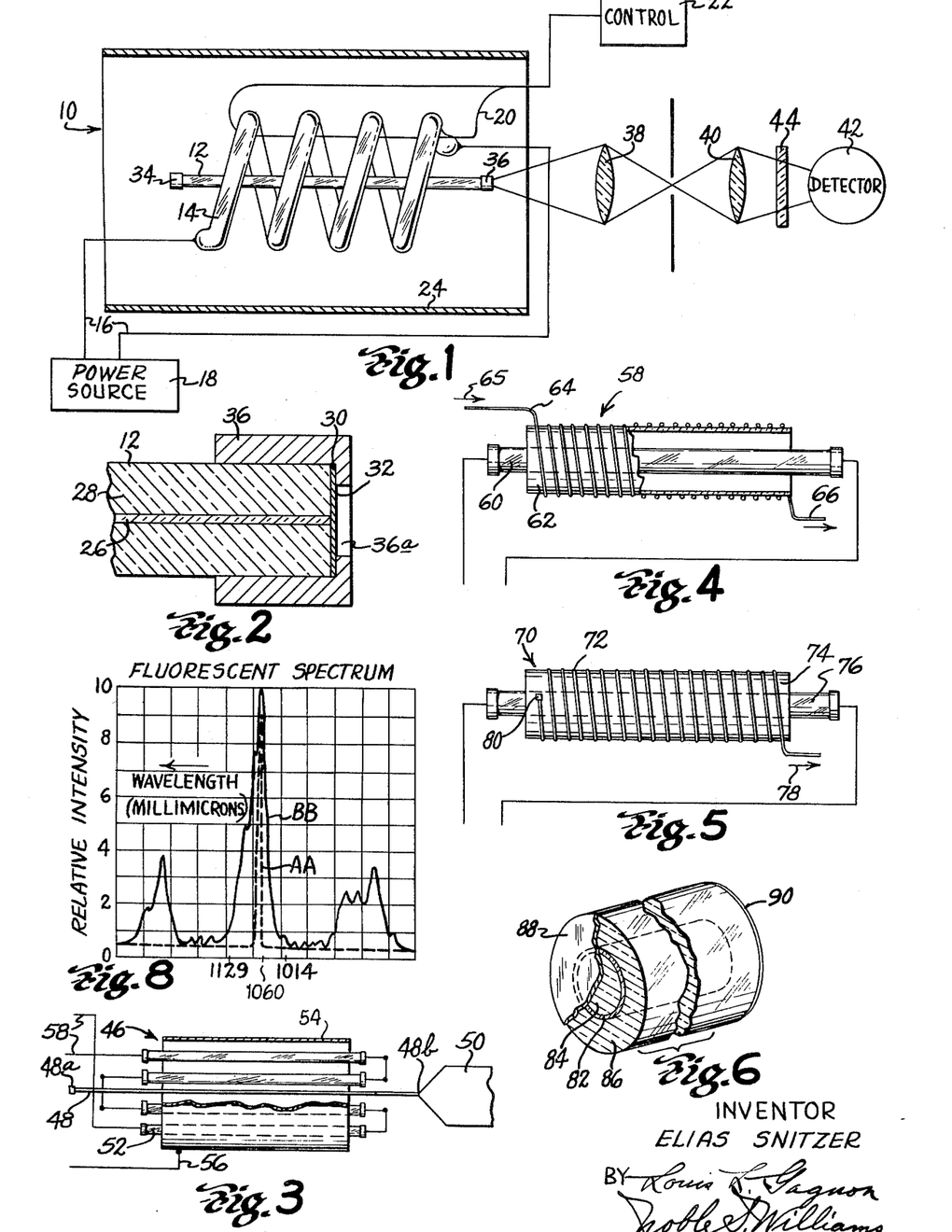
FIG. 1 is a diagrammatic view, partly in cross-section, showing a laser assembly including a rod formed of glass embodying an active laser material.
FIG. 2 is an enlarged fragmentary view of one end portion of the rod of FIG. 1.
FIG. 3 is a view similar to FIG. 1 but showing a modified form of laser construction.
FIG. 4 is a diagrammatic view, partly in section, showing a travelling wave type of laser amplifier embodying the invention.
FIG. 5 is another modified form of a laser construction.
FIG. 6 is a perspective view, partly in section, of another modified form of laser component.
FIG. 8 is a graph showing, as an example, the fluorescent spectrum obtained from a neodymium glass laser when laser oscillations are excited and when there are no laser oscillations, that is, only when the normal spontaneous emission occurs; the non-laser curve was obtained by replacing the Globar source in a Perkin-Elmer single beam infra-red spectrometer with a sample of the neodymium glass and by illuminating this glass with visible light only.

Referring to the drawings in detail and particularly FIG. 1, it will be seen that the numeral 10 indicates generally a resonant-cavity form of laser assembly for generating laser emission. This laser assembly comprises a laser component 12 in the form of a thin, long, cylindrically-shaped glass rod about which is concentrically disposed in spaced relation thereto a spirally shaped flash tube 14. The flash tube is of known construction and has electrical leads 16 attached to its opposite ends and which are also connected to a conventional high potential source of electrical power 18 in known fashion. Encircling the convolutes of the flash tube 14 and disposed so as to be in closely adjacent relation thereto is a conductor 20 for triggering the flash tube by a high voltage pulse as desired, said pulse being provided by the control unit 22.

About the flash tube 14 and laser rod 12 and in concentric relation thereto is shown a hollow cylindrically-shaped member 24 which has its internal surface adapted and arranged to act as a light reflector. If reference is now made to FIG. 2, it will be seen that the laser rod 12, in its embodiment of the invention, comprises a thin cylindrically-shaped fiber 26 formed of a barium crown glass containing an active laser material or ingredient. This fiber 26 is centrally disposed within an appreciably thicker cladding 28 formed of common commercially available soda-lime crown glass which is preferably of a lesser refractive index than the refractive index of the barium crown glass forming the fiber 26. Solid rods of the laser glass without the cladding 28 may also be used.

A clad fiber of the type just described may be conveniently fabricated in the manner disclosed in the U.S. Pat. No. 2,992,517 to Hicks, Jr., either appropriately changing the contour of the forming rolls shown in this patent where the laser rod 12 is to have circular cross-section as herein shown by way of example or using cylindrical forming rolls as shown in the patent where the laser rod is to have a rectangular cross-section. The laser rod 12 may also be fabricated, especially where a relatively rigid rod structure is desired, according to the method and by use of the apparatus disclosed in the U.S. Pat. No. 2,980,957 to Hicks, Jr. The method of the latter patent uses a hollow tubing of the cladding glass into which is inserted a solid rod of the laser glass. The assembly of tubing and rod, carefully cleaned prior to assembly, is inserted vertically into a furnace having three successively arranged heating zones and the upper end of the assembly is held by a clamp which moves slowly down through the furnace as the drawing operation proceeds. By conventional use of a baiting rod, the heat-softened lower end of the tubing-rod assembly is initially drawn out through an aperture in the bottom wall of the furnace at a velocity so related to the several furnace temperatures that the cladding-rod assembly is reduced to a desired external diameter. The drawing velocity is preferably maintained uniform by use of a vertical straight-line-draw machine having a screw driven clamp attached to the baiting rod or using traction drawing rolls engaging the drawn laser rod. Laser rods of rectangular cross-section are conveniently fabricated by use of forming rolls as shown in the last-mentioned Hicks, Jr. patent, but the use of forming rolls is preferably dispensed with in fabricating laser rods of circular cross-section.

To obtain laser oscillations in a resonant cavity structure requires the establishment within the cavity of standing waves. This can be done essentially in three ways as follows.

One method of doing this is to have optically homogeneous material with two reflectors facing each other and disposed parallel to one another and with the optically active material contained between them. The standing waves herein established correspond to approximately plane waves which reflect back and forth between the reflectors. In order to have good laser operation in such a cavity, a high degree of optical perfection is required. This is difficult to obtain in crystals, especially large crystals. However, by having the active material in the form of a glass, as disclosed herein, samples of glass of large sizes can be made with superior optical qualities for use in forming lasers in accordance with the present invention.

The second method for obtaining standing waves is dependent on a surface wave which is established at the interface between two materials of differing indices of refraction—between any laser material and anything else—at least one or both of which materials contains active ions suitable for laser oscillations. The direction of propagation of such a surface wave is parallel to the interface. The resonant cavity is formed by terminating the interface with two reflectors which face each other and are substantially perpendicular to the interface. The use of two glasses of different indices of refraction makes it possible to form such a surface of superior optical quality.

The third method is a small fiber exciting distinct modes. Suitable mode propagation fiber constructions are disclosed in the copending application of John W. Hicks, Jr. et al. entitled OPTICAL ENERGY TRANSMITTING DEVICES AND METHOD OF MAKING SAME, Ser. No. 12,128, filed Mar. 1, 1960, and the copending application of Elias Snitzer et al. entitled OPTICAL RESONANT CAVITY, Ser. No. 66,815, filed Nov. 2, 1960, and both assigned to the same assignee as the present application. These fiber constructions are similar to that illustrated in the enlarged end view of FIG. 2, and include a cladding of a low index of refraction glass surrounding a core of high index of refraction glass. As the diameter of a core of circular cross-section is reduced, mode propagation can be limited to one or a few low order modes. The lowest order mode, the $HE_{11}$ hybrid mode, does not have a cut-off. The cut-off parameters for the modes designated $TE_{0m}$, $TM_{0m}$, $HE_{1m}$, and $HE_{nm}$ ($n \geq 1$) are the $m$th roots of the $n$th order Bessel function, i.e., $$J_n(u_{nm}) = 0, \tag{1}$$

and for the $HE_{nm}(n \geq 2)$ modes it is given by the solutions of $$\frac{J_{n-2}(u_{nm})}{u_{nm}J_{n-1}(u_{nm})} = -(n-1)\frac{n_1^2 - n_2^2}{n_2^2}, \tag{2}$$

wherein $n_1$ and $n_2$ are the indices of refraction of core and cladding. The cutoff parameters are in turn related to the properties of the guide by $$u_{nm} = 2\pi (a/\lambda)(n_1^2 - n_2^2)^{\frac{1}{2}}, \tag{3}$$

where $a$ is the radius of the core, and $\lambda$ the free space wavelength.

Except for the $n=0$ modes, for each mode another one can be obtained with the same propagation properties by rotating the field distribution by $\pi/n$. Hence, all the modes with $n \geq 1$ are doubly degenerate. This degeneracy can be removed by destroying the circular symmetry, by distorting for instance, the fiber cross section from a circle into an ellipse. By reducing the diameter of the core, only the $HE_{11}$ can be allowed to propagate. The next higher modes are the $TE_{0m}$ and $TM_{0m}$ with $u_{01} = 2.402$. For an index of refraction combination of core and cladding of 1.56-1.52, the cut-off for the 01 modes for the green line of Hg at 0.546 $\mu$ corresponds to a radius of 0.59 $\mu$. This is well above the 0.1 $\mu$ radius core of fibers that have been made and in which the $HE_{11}$ mode has been observed in the visible spectrum.

As will presently be explained more fully, the centrally disposed fiber 26 of the FIG. 2 laser rod construction is formed of a lasering material and provides a lasering operation giving rise to induced emission light energy within the core material 26. The portion of the emitted light energy which propagates by mode selection along the length of the core fiber 26 induces or stimulates further light emission, thus enhancing the lasering action. Since the probability for induced emission by one photon in a given mode is the same as the probability for spontaneous emission into the same mode, a measure of the coupling into a desired mode is given by the fraction of spontaneous emissions into that mode.

In an open structure like a Fabry-Perot Interferometer (FPI), spontaneous emission is equally probable into all the modes, both the desired ones corresponding to normal or near normal incidence of radiation reflected back and forth between the FPI plates, and for the light which is emitted out the sides.

For a Lorentzian line shape with line which $\Delta\lambda$, the number of modes in a volume V is $$P(\lambda)\Delta\lambda = 8\pi^2 V \Delta\lambda\lambda^4 \tag{4}$$

where $P$ is the density of modes per unit wavelength interval without the line of Lorentzian line shape and of line width $\Delta\lambda$ centered about the wavelength $\lambda$. The value of $V$ depends on the design of the FPI. For a rough estimate let $V = 1$ cm$^3$, $\lambda = 0.6$ $\mu$ and $\Delta\lambda = 10^{-2}$ Angstrom. Then the fraction of all spontaneous emissions into one mode is approximately $10^{-9}$. To initiate maser oscillations, enough pumping power must be supplied to overcome the substantial relaxation mechanism of spontaneous emissions into undesired modes.

Mode coupling in a dielectric waveguide of the FIG. 2 type is intermediate between that of an open structure such as an FPI and a closed structure like a metallic waveguide. A radiating atom in the core of a fiber can emit into either a bound dielectric waveguide mode or any one of a large number of unbound modes. From a geometrical optics viewpoint, the unbound modes correspond to light emitted in the core fiber leaving the fiber by striking the core-cladding interface at less than the critical angle for total internal reflection. If the unbound modes are included, the total number of modes is approximately the same as for the FPI. However, the coupling into a bound mode is much stronger than for the unbound ones.

The dielectric guide of FIG. 2 is similar to a metal guide with walls that have a finite value of electrical conductivity. In the latter case there is a large number of nonpropagating modes which are strongly absorbed. The coupling into the weakly absorbed propagating modes is much stronger than for the other modes. In the limit of infinite conductivity for the walls, the propagating modes are undamped and the coupling to the other is zero. To obtain emission only into bound waveguide modes in the dielectric guide would require a core index of refraction which is infinitely large compared to the cladding index. The conductivity of the walls of a metallic guide is usually sufficiently high to justify considering it as a single or few mode structure. However, in the dielectric guide all the modes must be considered, because the core index is far from infinitely large compared with the cladding. In fact, for glass fibers in the visible region of the spectrum, the refractive indices differ by only a few percent.

For an emitting atom in the core, the coupling into modes in which the light propagates out the sides is less than for an open structure. This can be seen by considering the reverse process of light incident on the core from outside. Owing to the difference in refractive indices of core and cladding, partial reflection occurs. Hence the unbound modes have an average energy density in the core which is smaller than in the cladding. However, the index difference is small for glass fibers, and a sufficiently good approximation is obtained by assuming that the coupling to the unbound modes is the same as for an open structure.

In the nonrelativistic limit, the matrix element for a transition from state $a$ to state $b$ of an atom with the spontaneous emission of a photon into the $s$th mode with vector potential whose spatial part is $A_s(r)$ is proportional to $$\int \psi_b^* (p \cdot A_s) \psi_a d\tau, \tag{5}$$

where $d\tau$ is the incremental volume and $p$ is the momentum of the electron making the transition from eigenstates $\psi_a$ to $\psi_b$. For the unbound states, $A_s$ can be approximately taken as plane waves in a volume $L^3$, $$A_s = e_s (4\pi c^2/L^3)^{\frac{1}{2}} \exp\{ik_s \cdot r\}, \tag{6}$$

where $c$ is the velocity of light, $e_s$ is a unit vector in the direction of polarization, and $k_s$ the propagation vector of the emitted photon. The number of unbound states is given by Eq. (4). The transition probability $T_1$ for spontaneous emission into all the unbound modes is proportional to the product of the square of the matrix element for a transition into one of the unbound modes times the number of modes per unit frequency. Hence, $$T_1 \alpha 8\pi^2 n_a^2/(c\lambda^2), \tag{7}$$

where $n_a = (n_1 + n_2)/2$ is the average index of core and cladding. It has been included to take approximate account of the wavelength in the refractive medium of which the fibers are made.

For the bound modes the transition probability depends on an integral of the form of Eq. (5), with $A_s$ now the vector potential for a bound mode. It is sufficient for the approximate treatment here to take $A_s$ of the form of Eq. (6) but with the volume $L^3$ replaced by $LA$, where $L$ is the length of the fiber and $A$ the core area. The transition probability $T_2$ into the bound modes is then proportional to $1/LA$ times the density of modes in a fiber of length $L$. If the fiber cross section is small enough so that only the doubly degenerate $HE_{11}$ mode propagates, the number of modes in length $L$ for a linewidth of $\Delta\lambda$ with a Lorentzian line shape is $$4\pi L(\Delta\lambda) n_a/\lambda^2. \tag{8}$$

The average index $n_a$ is used instead of $N_1$ because the phase velocity for mode propagation is intermediate between $c/n_1$ and $c/n_2$. The exact value depends on how far $\lambda$ is from the cutoff wavelength for that mode. Then $T_2$ becomes $$T_2 \alpha 4\pi/cA. \tag{9}$$

The ratio of the spontaneous emission probability into the desired bound modes to the probability for emission into all the unbound ones is $$T_2/T_1 = \lambda^2/(2\pi A n_a^2). \tag{10}$$

The condition for only $HE_{11}$ propagation is just met if Eq. (3) is satisfied with $u_{01} = 2.402$. Using this value in Eq. (3), the area can be eliminated in Eq. (10) to give finally $$T_2/T_1 = 1.4(n_1 - n_2)/(n_1 + n_2). \tag{11}$$

The above gives the fraction of light emitted into the two $HE_{11}$ modes which are polarized perpendicular to one another. For the index of refraction combination of $n_1 = 1.56$ and $n_2 = 1.52$, $T_2/T_1$ is approximately $1.8 \times 10^{-2}$.

A fiber terminated with at least partially reflecting ends provides a resonant cavity structure. To find the ratio of the spontaneous emission $T_2^1$ into a single cavity mode to that emitted into all the unbound modes two cases must be distinguished. They occur when the material linewidth $\Delta\lambda m$ is greater or less than the cavity linewidth $\Delta\lambda c$. For $\Delta\lambda m >> \Delta\lambda c$ one need only divide Eq. (10) or Eq. (11) by the number of modes given by Eq. (8). From the definition of the quality factor Q as derived below, the resulting equation is unaltered by multiplication by $Q(66\lambda c)/\lambda$. This gives $$T_2^1/T_1 = [Q\lambda^3/16\pi^2 A L n_a^3 9 \cdot [2\Delta\lambda c/\Delta\lambda m]. \tag{12}$$

From a detailed quantum mechanical calculation by Senitzky appearing in the Phys. Rev., Vol. 119, page 1807 (1960), the second factor in Eq. (12) is replaced by one in which $\Delta\lambda c >> \Delta\lambda m$. In this case the usual Purcell formula [Phys. Rev., Vol. 69, page 681 (1946)] is obtained for the enhancement of spontaneous emission in a cavity.

If N is the excess of atomic or molecular systems in the upper of the two states between which maser action takes place, the condition for oscillation in a fiber of volume V is $$N \geq Vh\Delta\nu/(4\pi\mu^2 Q), \tag{13}$$

where $h$ is Planck's constant and $\Delta\nu$ and $\mu$ are, respectively, the half-width and matrix element for the transition.

The quality factor or Q (ratio of energy stored to energy dissipated per cycle) is determined by the bulk absorption in the glass fiber and the reflectivity $r$ of the end plates. In fibers of 0.002-in. core diameter made from good optical quality glass, the attenuation is approximately 50% in 7 feet. From other observations on large fibers, the indications are that some of the loss is due to scattering by inhomogeneities at the boundary between core and cladding. Since the inhomogeneities are drawn out over a longer length in the smaller fibers, the transmission in this case is at least as good as the figure quoted above.

For reasonable values of the reflectivity of the ends, say $r=0.90$ to $r=0.98$, and for lengths L of a few centimeters, the Q is determined by $r$. Its value is given approximately by $$Q = 2\pi(L/\lambda)(1-r)^{31\,1} \tag{14}$$

If the difference in energy of a pumping photon versus the emitted maser photon, and other modes of decay are neglected, the minimum power to sustain N excited systems is $$P = Nh\nu/\tau \tag{15}$$

where $h\nu$ is the energy of one photon and $\tau$ is the lifetime of the excited state. Due to the dependence of N on V in Eq. (13), both N and P are reduced by the small cross section of the fiber. This is to be expected, since laser action depends primarily on the densities of pump power and excited states and not on their absolute values.

It will be apparent from the foregoing mathematical analysis that a laser element or component embodying the present invention has the important advantage that the external light source need provide less pump power than in the case of the FPI structure since the volume of lasering material per unit length is less in the laser element of the invention than in the FPI type of structure. Accordingly, the present invention enables lasering action to be attained by use of a light source of relatively high intensity but of relatively low total power as contrasted to the FPI type of structure. At the same time, the quality factor or Q or a resonant structure utilizing a lasering fiber embodying the present invention is not impaired and may even be substantially enhanced as compared with the FPI type of resonant structure since, as indicated by Eg. (14), the Q is directly proportional to the length L of the lasering fiber. Furthermore, as noted above, a clad lasering structure embodying the present invention is characterized by good mode selection of the emitted light energy and accordingly there is substantially stronger mode coupling to the desired modes as contrasted with the FPI type of structure.

Different types of propagation modes for laser oscillations have been observed in the neodymium glass laser described herein; in large cross-section rods of approximately ¼ inch diameter and three inch length having the sides ground but not polished but with the ends parallel and polished and fabricated of uniform optical material terminated by reflectors, as in a Fabry-Perot type resonant cavity, various laser oscillation modes have been observed. For clad rods, the modes corresponding to the clad dielectric wave guide modes above discussed have been observed and there have also been observed surface wave type modes in which the material lasers in a filament that stradles the material of the core and cladding.

A further advantage of substantial importance and heretofore unobtainable is that of being able to draw long clad fibers and superior optical quality and different indices with the core or cladding or both containing the active ion which is suitable for laser oscillations. In addition to making single, long clad fibers, one can also make large fused masses of fibers with the cores substantially parallel and separated from one another by a good optical quality glass which serves as the cladding and which is of a lower index of refraction than the core. Such fiber assemblies per se, but without use of a laser material, are now known in the prior art and are referred to as fused fiber optic assemblies. An assembly of this nature but using clad laser fibers may be fabricated in the manner disclosed in the U.S. Pat. No. 2,992,516 to F. H. Norton.

By controlling the size and indices of refraction of the core and cladding in the pumping wave lengths as distinct from the wave length at which laser oscillation takes place, that is, by using glasses for the core and cladding that have different dispersions, it is possible to obtain large assemblies of glass fibers which present essentially uniform optical characteristics for light travelling down the axis of such a bundle but which presents essentially different optical properties to the pumping light incident from the side thereof.

In forming such bundles, there are many commerically available glasses that have the same index of refraction but whose dispersions are different, and thus many different commercially available combinations of glasses could be used. For example, the commercially available Schott Glass No. F16 has an index of refraction at 480 millimicrons of 1.60546 and at 656.3 millimicrons has an index of refraction of 1.58789, whereas Schott Glass No. SK13 has an index of refraction of 1.59947 at the wave length 480 millimicrons and an index of refraction of 1.58873 at 656.3 millimicrons. If the SK13 is used as the core glass of a clad fiber, and at the wave length of approximately 1.06 microns at which the laser oscillations take place in this glass when doped with an appropriate amount of neodymium as hereinafter explained, such a fiber can readily be excited in desired wave guide modes by appropriate selection of the core fiber dimensions as previously explained in connection with mode propagation. In this case, the F16 glass would be used as the cladding and a fused array or bundle of such clad fibers would present different optical properties to the pumping light since the indices of refraction of the core and cladding are essentially the same in the center of the visible region of the spectrum whereas at the blue end of the spectrum the core index of refraction is less than that of the cladding. This permits the optical properties for the fused fiber bundle to be controlled independently for the side-incident pumping light and for the laser light which propagates parallel to the laser fibers.

In a particular laser rod construction of the type shown in FIGS. 1 and 2, the laser component comprising the fiber and cladding was in the form of a rod approximately three inches in length and one-eighth of an inch in diameter. The fiber 26 was formed of barium crown glass having a composition hereinafter described and containing as the active lasering ingredient the rare earth material trivalent neodymium, and was approximately 0.015 inches in diameter. In the preparation of this laser component, the opposite ends of the straight rod 12 were ground and polished so as to be in substantially parallel relation to each other and normal to the axis of the rod (good to within one minute of arc) and were thereafter coated with a silver layer, one of which is shown at 30, so as to be highly reflective to light within the fiber and impinging thereon. The exposed surfaces of the silver layers, such as the surface 32, were thereafter coated with a very thin protective coating of magnesium fluoride. Furthermore, the application of the silver layer on the end of the rod shown in FIG. 2 (which is the exit end of the rod) was so controlled as to provide approximately a 2 percent transmission factor. Thereafter, small protective caps 34 and 36 of a reflecting metal such as aluminum were applied over the ends of the rod, the cap 34 having a solid end wall while the exit-end cap 36 was provided with an opening 36a. The protective end caps are used to prevent the flash-tube light from deteriorating the reflective silvered ends. If in a particular construction the laser rod should happen to be so located relative to the flash tube or tubes that very little of the flash tube light strikes the end reflectors, the protective end caps last described may not be required.

The size of the opening 36a, as will be clear from the drawing, is made at least large enough to allow a collective lens such as lens 38 disposed in axially aligned relation to the fiber 26 to focus upon the end of the fiber in such a manner as to collect substantially all of the radiation emitted therefrom and direct the collected radiation toward a second lens or lens system such as at 40 which thereafter directs the radiation to a suitable means such as a detector or the like indicated at 42. This detection means for the laser component just described may be a photo-multiplier provided with a suitable infra-red (IR) filter 44 in the path of the radiation.

When the flash tube 14 as the pump power source is triggered by the high voltage pulse, it will be appreciated that yellow and blue light which is principally emitted from the flash tube travels in substantially all directions towards the laser component 12. Since the cylindrical cladding 28 of the laser has an index of refraction slightly less than the neodymium barium crown glass forming the fiber 26, it serves as an optical means for collecting and concentrating the pumping light more efficiently upon the thin long laser glass fiber therewithin thereby effecting a decided improvement in efficiency (which is substantially proportional to the index of refraction of the cladding) over that which would otherwise be obtained if only an unclad laser glass fiber were being employed. Also, other factors such as structural strength, concentric alignment, ease of handling, supporting, coating etc. of such a thin fiber should be considered and, for this reason, even though an unclad laser fiber of barium crown glass with neodymium may be used in such an assembly and made to laser, a clad fiber is preferred.

Barium crown glasses with varying percentages of neodymium therein and which are set forth herein as illustrative of one form of applicant's invention have been made and used to form a laser fiber cavity with and without cladding thereon. These have been used, for example, with a General Electric FT524 flash tube operating from a condenser bank providing 80 microfarads charged to a minimum power of 2.5 kilovolts to produce laser oscillations. With another flash tube (an E.G. & G. tube No. FX33) and a power input of about 25 watt seconds, laser emission have also been obtained. Concentrations of neodymium 0.1%, 0.25%, 0.50%, 1.0% and 2.0% by weight were used in barium crown glasses with successful lasering results. Laser emission took place at approximately 1.06 microns. For the 2% concentration, there was no indication of concentration quenching. This was established by measuring the lifetime for the fluorescent emission for each of these glasses of different concentrations and finding that they were the same in all cases. This indicated that there was no loss of quantum efficiency at the higher concentrations.

The batch composition of the barium crown glass having 2% by weight of neodymium and mentioned previously as an example of a laser glass for forming the fiber 26 contains the following ingredients:

| | |
|---|---|
| Silica ($SiO_2$) | 237.6 units |
| Potassium Carbonate ($K_2CO_3 \cdot 1\frac{1}{2}H_2$) | 107.8 units |
| Barium Carbonate ($BaCO_3$) | 68.1 units |
| Barium Nitrate ($Ba(NO_3)_2$) | 40.8 units |
| Barium Hydroxide ($Ba(OH)_2 \cdot 8H_2O$) | 49.4 units |
| Antimony Oxide ($Sb_2O_3$) | 4.0 units |
| Neodymium Oxide ($Nd_2O_3$) | 10.0 units |

This laser glass was prepared by placing the batch material in a clay pot in a Globar electric furnace using a filling time of 2 hours at a temperature of approximately 2600° F. and then elevating the temperature of the melt to approximately 2700° F. and stirring for about 1 hour before lowering the temperature of the glass to approximately 2550° F. where it was maintained for a period of about 5 hours before casting. The size of the above batch was one pound and, of course, the preferred temperature at casting is a function of the size of the cast. No special atmosphere was necessary in the furnace.

The percent oxide composition by weight as calculated from this batch would be as follows:

| | |
|---|---|
| Silica ($SiO_2$) | 57.4% |
| Potassium Oxide ($K_2$) | 14.9% |
| Barium Oxide (BaO) | 24.3% |
| Antimony Oxide ($Sb_2O_3$) | 1.0% |
| Neodymium Oxide ($Nd_2O_3$) | 2.4% |

These percentages will be a very close approximation of what a chemical analysis of this glass would give.

With a concentration of 0.1% by weight of neodymium in a similar barium crown glass, a near minimum condition for lasering action was obtained while using the FT524 flash tube operating from a condenser bank of 320 microfarads charged to 5 kilovolts.

For another group of glasses, with different concentrations, it was found that for a 10% concentration of $Nd_2O_3$, there was a shortening of the lifetime for the fluorescent emission thereby indicating some concentration quenching.

Hence, the upper limit of concentration of the neodymium in the barium crown glass for forming the laser is in the order of possibly 30%. On the other hand, the lower limit, if an optical system of high efficiency is employed for coupling the pump light to the fiber would provide lasering at a neodymium concentration as small as 0.10% or less. Under optimum conditions, a concentration of as little as 0.01% by weight of neodymium oxide will laser. Thus, I now believe that the limits for the concentration of the neodymium are between 0.01% and approximately 30% by weight.

While good efficiency as roughly determined by the lifetime of the fluorescence is indicated for the barium crown glass with neodymium, most silicate glasses are suitable as a laser glass and a further example of such silicate glass is soda-lime base glass produced by American Optical Company and sold commercially under the AO Crown and to which like amounts of neodymium has been added as the active material. Another glass of good Q value when combined with neodymium is a 15% by weight lead glass. Other inorganic base glasses into which neodymium or others of the active materials have been added and examined for quantum efficiency as determined by their lifeteimes for fluorescence emission are oxide base glasses formed of aluminum zinc phosphate, sodium borate glasses, 15 weight % of PbO silicate glass, high index of refraction lead silicate glass, high silica borosilicate glasses and germanate glass. Fluoride base glasses such as beryllium fluoride can also be used as can the previously mentioned arsenic trisulphide glass. The indices of refraction and dispersion of the above inorganic base glasses are of known established commercial values but would vary somewhat when doped with selected amounts of the active materials. For the above barium crown glass with 2% neodymium, the index of refraction is 1.5427% and its dispersive value is 59.4.

It is well to keep in mind that the base glass to which the active laser material is to be added should be non-absorbing and non-scattering to the wave lengths of interest which are the pumping lines for the active ions being used and the wave length at which laser emission takes place.

Neodymium has already been mentioned as an active material or laser material with the fiber or core glass 26, and is in a trivalent form; other active materials include Samarium++, Samarium+++, Europium++, Europium+++, Uranium+++, Terbium+++, Holmium+++, Erbium+++, Thulium+++, Dyprosium+++, Ytterbium+++, Cerium+++, and Praseodymium+++. These materials, it is noted, are rare earth elements with the exception of uranium. These active materials may be used separately or in various combinations in the laser base glass.

An important advantage derived from the use of a cladding 28 upon the fiber laser core 26 was previously mentioned but merits repetition. In order to have a laser oscillatory structure, it is necessary to have a high Q cavity and this requires that means be provided for obtaining a condition whereby well defined standing waves be established across at least a part of the cross-section of the laser component. Since a single unclad glass sample of good optical quality and free from striae is hard to provide, it is an easier matter to employ a fiber of small cross-sectional size and use a cladding of greater thickness and lower refractive index, so that the cladding will act as a light pipe or wave guide structure improving the optical properties thereof from the point of view of a high Q cavity for laser oscillations. Also, it is possible to obtain the surface wave type of mode previously mentioned with high values of quality factor or Q. Furthermore, since the fiber is of relatively small cross-sectional size compared to the cladding and if the cladding is compatible therewith so as to give an interface of good optical quality, it is more likely that the entire length of the laser component will go into laser oscillations and thereby improve the coherence properties of the emitted beam.

While laser action has been obtained with a clad fiber of 0.015 inch for the fiber diameter, as mentioned previously, a lasering fiber of still smaller diameter may be used to arrive at a condition wherein only one or a few clearly distinguishable propagation modes can exist therein for reasons explained above. A fiber diameter of as small as 5 microns and a cladding thereon of glass of a lower index of refraction and of as little as 1 micron in thickness can be used. The upper limit of thickness of such a cladding is not critical, but its thickness should not be so great as substantially to attenuate the pumping light.

The conditions of laser oscillation in the visible and infra-red regions of the spectrum are well established. The fundamental requirements, however, are that the laser material be capable of fluorescing and that an inversion in population take place between the two different energy levels between which the fluorescent emission takes place. To fulfill the latter requirement, in the case of a glass laser, it requires that there also be fairly strong absorption of the pumping energy to permit pumping action by the light source.

While various rare earth and other laser materials have been mentioned, for a more detailed examination of the energy levels of such materials reference is made to D. S. McClure, "Electronic Spectra of Molecules of Ions in Crystals", Part II (Spectra of Ions in Crystals) SOLID STATE PHYSICS, No. 9, page 399 (1959). Attention is called at this time to the energy levels given in FIG. 9 for the neodymium triple plus ion which are plotted against wave numbers.

The use of organic glasses as the base glass into which the laser material is put have already been mentioned. The organic glasses include commercially available transparent organic plastics such as methyl methacrylate, or plexiglass, acrylics and vinyl chlorides which are solids at room temperature as well as sugars which have been melted to get rid of their crystalline structure and then cooled to form a glass. Also, organic glasses which at room temperatures are liquids and thus have to be cooled to obtain the glassy state and maintained at low temperatures by such means as liquid nitrogen, liquid helium or the like. An example would be ether-isopentane-alcohol cooled to approximately 77° Kelvin. The indices of refraction and dispersion of the above organic glasses are also of known values.

The rare earth material may be put into any of the organic glasses as free ions or as compounds of the active material such as neodymium acetate, neodymium chloride or a neodymium chelate dissolved in the glass.

Figure 10:
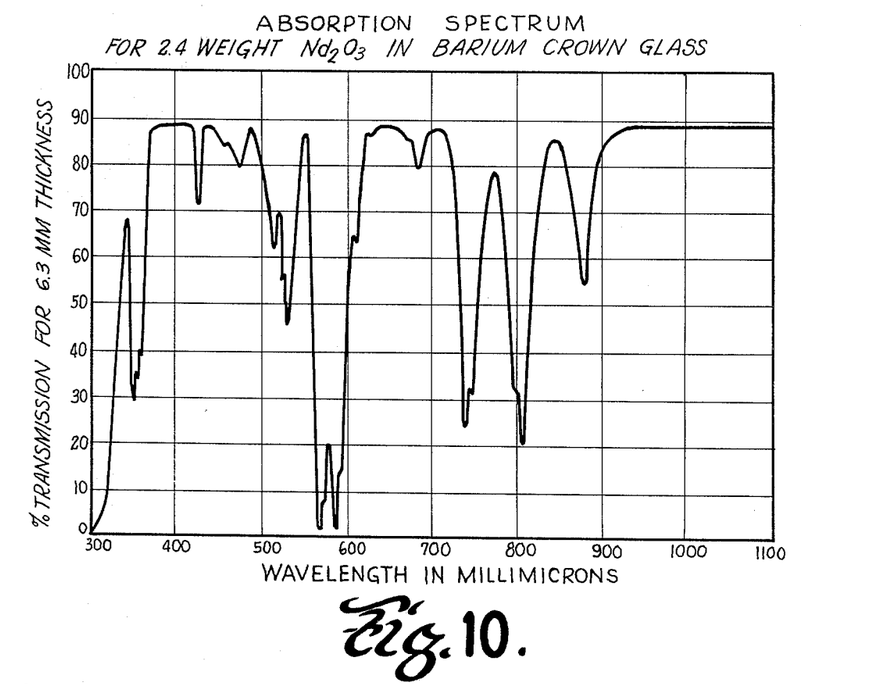
FIG. 10 is a graph showing the absorption spectrum of the neodymium ion.

In the selection of the light source, such as the flash tube 14 of FIG. 1 for pumping the laser oscillator or the laser amplifier, consideration should be given to both emission characteristics and the intensities which can be provided. The more efficient overall operation can be achieved if the pumping light source has its energy concentrated in the absorption bands of the laser material being used. The absorption spectra for neodymium − − − is given in FIG. 10 and it will be seen that it has a strong absorption band in the yellow at 5800 Angstroms (i.e. 580 millimicrons). There are also absorption bands at 5300A, at 3550A in the ultra-violet and several in the near infra-red. In order to make the glass fiber laser, it is necessary to absorb a sufficient amount of this pumping light to produce an inversion of population in the laser material. Thus, a light source must be used that has sufficient energy in the absorption bands of the laser material.

A mercury vapor lamp is well adapted for this use since it has a strong emission line at 5790 Angstroms, or a sodium vapor lamp may be used since it has strong lines at 5890A and 5895A. Also, as the pumping light, use may be made of a carbon arc whose electrodes are doped by the neodymium or rare earth whose spectrum lines coincide with the absorption bands of the laser material. With a flash tube such as in FIG. 1, the emission is of pulsed nature and accordingly is not continuous with time. Therefore, for CW or continuous wave laser operation, a continuous light source with enough intensity must be used and with good optical coupling being provided to get the pumping light into the sample. Means may be needed in continuous wave laser applications to carry heat away from the laser component since excessive temperature rise can impair the lasering action desired. For absorption in the yellow, 40% of the energy within the laser element is converted into heat; for absorption in the ultra-violet at 3500A, about 70% of the light energy within the laser element is converted to heat.

It can be seen from these conditions that the laser rod or component must be of a proper thickness or diameter. When it is too thick, the light energy does not get to the center of the laser material. It gets absorbed before it goes that far. Also, too much heat in continuous wave operation might be generated without being carried away properly. Thus, it is desirable to have the diameter of the laser fiber small, whether clad or unclad, so as to improve the surface-to-volume ratio thereof. In a clad fiber, the core of active material can be a very small cross-section but because of the cladding, the diameter of the whole unit could be sufficiently large to permit easy handling.

Figure 9:
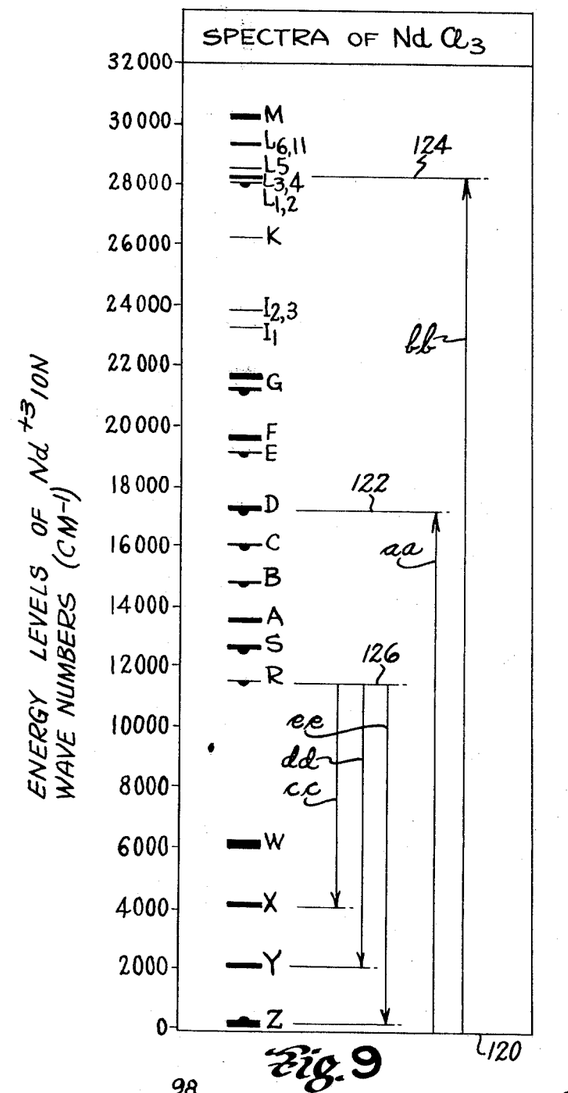
FIG. 9 is a diagram showing the energy levels, for example, of the neodymium+++ ion and the levels between which spontaneous emission occur to give the normal fluorescent spectrum for neodymium in the glass.

In FIG. 9, an Energy Level Chart for the neodymium triple plus ion is shown. The chart is described in detail in the following reference: E. H. Carlson and G. H.

Dieke, "The State Of the Nd $^{3-}$ Ion As Derived From The Absorption And Fluorescence Spectra of NdCl$_3$ And Their Zeeman Effects", JOURNAL OF CHEMISTRY AND PHYSICS, 34 1602 (1961). This energy level diagram is for small quantities of neodymium doped in lanthanum chloride. Although this diagram is for the chloride, it is substantially the same for the neodymium glass.

The laser energy is pumped from ground level, indicated in this figure at 120, to higher atomic levels and principally to levels D and L as indicated by horizontal lines 122 and 124 and by pumping lines aa and bb. At this time, the atoms of the material are in a highly excited state. They then give off some of this energy as heat while dropping down or making a non-radiative transition to a lower energy level R indicated at 126. The transition from this energy level to the three lower levels X, Y and Z as indicated by lines cc, dd, and ee is accompanied by strong emissions.

In FIG. 8, an emission spectrum or fluorescent spectrum such as obtained with and without laser action of the neodymium in the glass is indicated by dotted line AA and solid line BB respectively. In this figure, relative intensities from 0 to 10 are indicated in a vertical direction and wave lengths (in millimicrons) are plotted in the horizontal direction thereof.

Since the cross-sectional size of the glass fiber for laser purposes can be exceedingly small, and even though a clear glass cladding of lower refractive index and of very small size is used, it is possible to secure a multiplicity of such fibers together in closely bunched relation so that these fibers may be operated in phase. In such a case, the multifiber group so formed would have its opposite ends ground and polished so as to be optically flat and normal to the axis at the end of the bundle. The opposite ends of the bundle would then be silvered or otherwise coated for high reflectivity and, as in the case of the rod 12 of FIG. 1, would have one of these reflective coatings of such a thickness as to provide approximately a 2% light transmission.

In FIG. 3 is shown a modified form of laser assembly 46 employing a laser component 48 much like that of FIGS. 1 and 2 in that it is comprised by a thin, long laser fiber formed of glass with a glass cladding of lower refractive index thereon, and has reflecting end surfaces 48a and 48b of the types described in connection with FIGS. 1 and 2. Thus when a pumping action of the laser component is taking place within the cavity thus formed, light is transmitted through the 2% transmissive coated end 48b thereof and enters an optical system or the like generally indicated by the numeral 50. In this modified construction, a plurality of spaced and serially-energized flash tubes 52 are employed at circumferentially spaced locations about the laser component, and outwardly of the flash tubes and in concentric relation to the laser component is disposed a metallic reflector 54 for concentrating pumping light onto the glass fiber core of the component. Advantage may be taken of the fact that the reflector 54 is made of metal by connecting a high voltage triggering-potential lead 56 directly to the reflector. Conductors 58 are shown for supplying pump power to the bank of parallel connected flash tubes 52.

In FIG. 4 is shown a different form of construction 58 which is intended to function as a travelling wave type of laser amplifier. In this construction, a pumping light source is indicated at 60 and around this light source and in concentric relation thereto is disposed a cylindrically-shaped transparent tube 62 about which is coiled, in turn, a thin, long flexible glass laser component 64. This component comprises a laser fiber formed of glass and a clear glass cladding of lower refractive index and accordingly provides wave-guide mode propagation for reasons previously explained. This filament-like component is of such length and cross-sectional dimensions as to be readily coiled around the tube 62 a large predetermined number of times. The arrangement just described is such that when pumping energy is provided by the light source 60 during transmission of an optical signal from end to end through the laser component 64, as indicated by the arrow 65, energy will be absorbed by the laser fiber in such a manner that energy builds up in and is then emitted by the coiled filament-like component 64 so as to amplify this optical signal as it travels from the input end to the output end 66 of the fiber. In such an arrangement, the signal gets boosted in intensity, for example, to an amount sufficient to offset any attenuation thereof during a long distance transmission of the optical signal through a long length of clear fiber before reaching the input end of this travelling wave type of booster assembly. It will be noted that the pumping light enters the fiber through the side walls thereof, while the increase in signal strength is due to the absorption of energy from this pumping light by the laser component and the emission of this absorbed energy under stimulation of the signal travelling by wave guide mode propagation along the length of the laser fiber.

In order to get wave guide mode propagation, as the mode in which laser oscillations build up or laser amplication takes place, it is necessary as previously explained for the fiber core to have a higher index of refraction than the index for the cladding. However, because the field distribution in a wave guide mode penetrates into the cladding as pointed out above, it is possible to incorporate the active neodymium ions into the cladding and to have the core made of a clear undoped glass. Under these conditions, some degree of mode selection is provided for the modes whose fields penetrate the most into the cladding and are accordingly the ones to be excited by laser action in the cladding.

In FIG. 5, a modified construction is shown at 70 and instead of being such as to act as a signal amplifier, the construction is such as to serve more in the sense of a resonant cavity laser. The similar thin, long flexible laser component is shown at 72 and comprises a laser fiber of glass which is clad with clear lower-index glass, as before, and wound in similar manner upon a transparent cylindrical tube 74. This tube is in concentric relation to the pumping flash tube 76, as before, and the arrangement is such as to provide pumping for fluorescent laser emission from one end of the fiber as indicated by the arrow 78. However, in this case, the opposite end of the fiber, as indicated at 80, will be optically finished and coated with a capped reflective coating in the same manner as the non-transmitting end of the fiber in FIG. 1. The great length of this laser component enables a build-up of energy in the fiber.

While not shown for reasons of simplicity, the structures of FIGS. 4 and 5 may utilize a concentric external light reflector arranged similar to and having the same light concentrating purpose and function as the reflector 54 of the FIG. 3 construction.

A different modified form of resonant cavity laser component is indicated in FIG. 6, In this case, the component is formed by a hollow cylindrically-shaped thin, long element 82 formed of a glass laser material. A core of clear soda-lime glass is contained at 84 within this hollow cylindrical member and in good optical contact therewith, and a similar glass as a cladding is shown at 86 surrounding the laser glass element. Both the core 84 and cladding 86 have a lower refractive index than does the laser glass. The opposite ends of this cylindrically-shaped laser component are optically finished so as to be parallel to each other and are coated with a reflective layer, such as silver, as indicated at 88 and 90, but with one of these two coatings being applied under carefully controlled conditions so as to have approximately a 2% light transmission for the fluorescent emission provided during lasering in a manner similar to that described above with reference to FIGS. 1 and 2.

Figure 7:
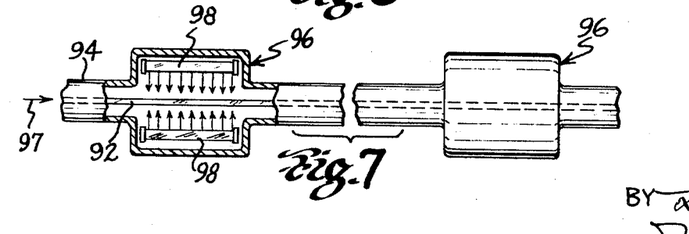
FIG. 7 illustrates diagrammatically portions of a communication line employing optical energy as the signal and laser amplifier means at selected points as booster means.

In FIG. 7 is indicated a fiber optical communication line 92 disposed within an outer protective shield 94, and at spaced locations therealong may be disposed a laser amplifier as indicated generally at 96 for boosting an optical signal travelling in line 92 as suggested by arrow 97. This arrangement enables attenuation of such a signal to be minimized or avoided when transmission is taking place over extended distances. Pumping light sources 98 are diagrammatically indicated within the amplifier housing 96, and it will be apparent that a laser fiber amplifier arrangement disposed therewithin may very well be the coiled fiber laser type described above so as to absorb pumping light energy as a travelling wave structure for strengthening or amplifying the optical signal traversing the line 92.

Figure 11:
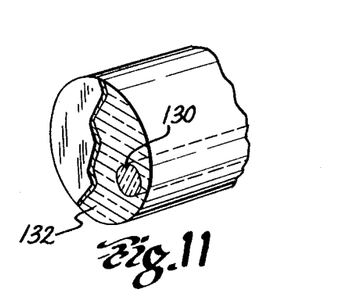
FIG. 11 is a perspective view, partly in section, of another form of laser component.

A laser component or rod of a geometry quite similar to that shown in FIG. 6 can be obtained by having a single small diameter laser fiber 130 placed eccentrically relative to its cladding glass 132 as indicated in FIG. 11. Both the geometry shown in FIG. 11 and the geometry shown in FIG. 6 are of importance in pumping arrangements in which the pumping light enters the rod through the end of the rod from substantially all directions. A principal advantage of these geometries, when used with end pumping light, is that the skew rays internally propagated down the rod are more readily intercepted by the laser element than would be the case if the active laser glass were in the center of the rod. The precise positioning of the active laser fiber 130 relative to the axis of the cladding rod 132 and their relative transverse dimensions are a matter of detailed design considerations, depending upon the end results desired.

In addition to the use of pumping light sources that have strong lines at the same wave length regions in which the neodymium or other selected laser material absorbs pumping light energy, one can also incorporate in or place near the laser material a fluorescent material which serves to convert other wave length regions of the pumping light source into desired ones effective to pump the laser material. For example, most of the intensity of a high pressure mercury lamp is in the ultra-violet. If the fluorescent material last mentioned were incorporated in close proximity to a high-pressure mercury lamp and were positioned or arranged to illuminate the laser material and if, furthermore, the fluorescent material had the property that it would with a high quantum efficiency fluoresce in the yellow after absorbing ultra-violet light, then this would provide a suitable fluorescent converter type of pumping light system. Examples of such fluorescent materials are uranyl compounds including glasses and various commercially available fluorescent plastics.

Suitable materials incorporated into laser glasses or compounds of the active ions, such as recited just above, can have the property that absorption of pumping energy may take place by way of the other material or parts of the compound of the rare earth and a subsequent transfer of energy may then take place directly to the laser ion without the need for the emission of light energy and re-absorption of the emitted light energy by the lasering rare earth. An example is when uranium and samarium are incorporated into calcium oxide; some light is absorbed by the uranium ion, and a non-radiative transfer of energy is made to the samarium ion. Another example is the absorption of light by the ligand of a chelate an then the subsequent non-radiative transfer of energy to a rare earth ion effective to provide lasering action.

Figure 12:
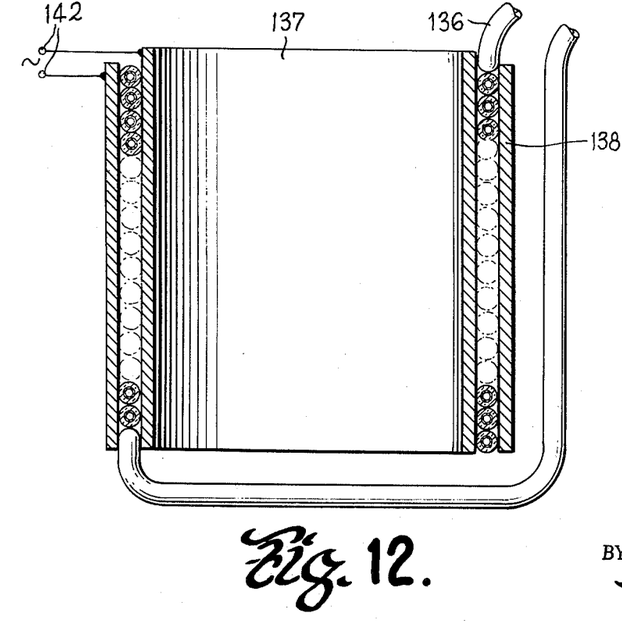
FIG. 12 is a cross-sectional view of a laser structure embodying a further modified form of the invention, FIG. 12a representing an enlarged cross-sectional view of the hollow clad fiber used in the FIG. 12 construction.
Figure 12A:
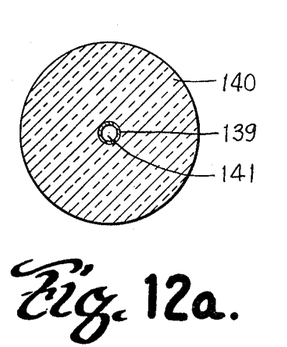

A laser component of modified form and its associated energizing structure, providing a character of laser operation analogous to that last described, is illustrated in FIGS. 12 and 12a. The laser component 136 is of elongated hollow tubular construction presently to be described more fully, and is helically wound upon a metal cylinder 137. This helically wound laser component is covered by a metal cylinder 138. An enlarged cross-sectional view of the laser component 136 is illustrated in FIG. 12a, and it will be seen that this component includes a hollow glass tubing 139 of given index of refraction $n_1$ and a concentric enclosing glass cladding 140 of smaller index of refraction $n_2$. The hollow interior of the tubing 139 is filled with a mixture of helium and neon gases which, of course, have unit value of index of refraction thus to establish appropriate boundary conditions for wave guide mode propagation within the tubing 39 by reason of the lower value of index of refraction of the cladding 140. In particular, the tubing 139 is filled with helium at a pressure of approximately one millimeter of mercury and with neon at a pressure of approximately 1/10th millimeter of mercury. The cladding 140 may by way of example have an external diameter of 100 microns, and the tubing 139 may in this example have an internal diameter of ten microns with a wall thickness of one micron. The metal cylinders 137 and 138 are connected to input terminals 142 which are energized from a source of radio frequency potential, the source having a frequency of the order of 30 megacycles and a power output of the order of 50 watts.

The radio frequency energization applied between the cylinders 137 and 138 of the FIG. 12 structure causes the helium gas to absorb energy by electron excitation, and this absorbed energy is then transferred by a resonant form of action to the neon gas to effect an inversion of population between two energy levels of the latter. Thus the helium gas transfers energy from the input radio frequency excitation to the neon gas, with subsequent radiative energy transition two energy levels by the latter to provide laser action. The laser component 136 is hermetically sealed at its ends as minute glass discs or the like fused thereto, and the end surfaces may be polished to provide a light amplifier or one or both of the polished ends may be provided with reflective silvered end coatings as previously described in connection with FIGS. 1 and 2 to provide a resonant cavity structure. It will be understood that the particular cross-sectional parameters of the laser component 136 and its operating temperature, for example by immersion in a liquified gas at low temperature, are selected according to a particular desired application as will be well understood by those skilled in this art.

While specific forms of invention have been described for purposes of illustration, it is contemplated that numerous changes may be made without departing from the spirit of the invention.

Having described my invention, I claim:

1. In a laser, a solid luminescent sensitive element of Fabrey-Perot optical regenerative configuration and consisting essentially of a clear glass activated with trivalent ytterbium ions.

2. A laserable glassy material comprising a host material containing a quantity of a fluorescent ingredient which, in relation to the prevailing laser emissive light absorptive characterisitics of said host material, supports in said host material a sufficient inversion in population between two energy levels of said fluorescent ingredient as to provide, at the wavelength of stimulated emission of said fluorescent ingredient, light energy by stimulated emission in excess of all light energy losses in said laserable glassy material.

3. A laserable glassy material according to claim 2 wherein said fluorescent ingredient is comprised of a material selected from a group consisting of trivalent erbium, trivalent holmium, trivalent ytterbium, trivalent thulium, and combinations thereof.

4. A laserable glassy material according to claim 3 wherein said group additionally consists of trivalent praseodymium, divalent samarium, trivalent europium, trivalent uranium, and trivalent dysprosium.

5. A laserable glassy material according to claim 4 wherein said group additionally consists of trivalent samarium, and divalent europium.

6. A laserable glassy material according to claim 2 wherein said host material is comprised of an inorganic glass.

7. A laserable glassy material according to claim 6 wherein said inorganic glass is a silicate glass.

8. A laserable glassy material according to claim 6 wherein said inorganic glass is selected from a group consisting of barium crown glass, soda-lime silicate glass, flint glass, lead silicate glass, sodium borate glasses, high silica borosilicate glass, germanate glasses, aluminum zinc phosphate glasses, beryllium fluoride glass, silicate glasses, and arsenic trisulfide glass.

9. A laserable glassy material according to claim 2 wherein said host material is comprised of an organic glass.

10. A laserable glassy material according to claim 9 wherein said organic glass is selected from a group consisting of a methyl methacrylate organic glass, an acrylic organic glass, a vinyl chloride organic glass, glycerine, and ether-isopentane-alcohol.

11. A laserable glassy material according to claim 2 wherein said host material is a silicate glass.

12. A laserable glassy material according to claim 3 wherein said host material comprises a glassy material selected from a group consisting of barium crown glass, soda-lime silicate glass, flint glass, lead silicate glass, sodium borate glasses, high silica borosilicate glass, germanate glasses, aluminum zinc phosphate glasses, beryllium fluoride glass, silicate glasses, arsenic trisulfide glass, a methyl methacrylate organic glass, an acrylic organic glass, a vinyl chloride organic glass, glycerine, and ether-isopentane-alcohol.

13. A laser component having a structure providing a wave propagation path, all surfaces of said component in said wave propagation path having total scattering of sufficiently low value to permit light energy by stimulated emission in excess of all light energy losses and at least a portion of a surface of said structure in said propagation path being at least partially transmissive of laser emissive light, said component comprising a glassy host material containing a quantity of a fluorescent ingredient which, in relation to the prevailing laser emissive light absorptive characteristics of said host material, supports in said host material a sufficient inversion in population between two energy levels of said fluorescent ingredient as to provide, at the wavelength of stimulated emission of said fluorescent ingredient, light energy by stimulated emission in excess of all light energy losses in said component.

14. A laser component according to claim 13 wherein said component is at least partially surrounded by a cladding material.

15. A laser component according to claim 14 wherein said cladding material has an index of refraction different from that of said component.

16. A laser component according to claim 14 wherein said cladding material has a lower index of refraction than that of said component.

17. A laser component according to claim 15 wherein said host material is an inorganic material.

18. A laser component according to claim 15 wherein said host material is an organic material.

19. A laser component according to claim 17 wherein said cladding material is an inorganic material.

20. A laser component according to claim 17 wherein said cladding material is an organic material.

21. A laser component according to claim 18 wherein said cladding material is an inorganic material.

22. A laser component according to claim 18 wherein said cladding is an organic material.

23. A laser component according to claim 13 wherein said fluorescent ingredient is comprised of a material selected from a group consisting of trivalent erbium, trivalent holmium, trivalent ytterbium, trivalent thulium, and combinations thereof.

24. A laser component according to claim 23 wherein said group additionally consists of trivalent praseodymium, divalent samarium, trivalent europium, trivalent uranium, and trivalent dysprosium.

25. A laser component according to claim 24 wherein said group additionally consists of trivalent samarium, and divalent europium.

26. A laser component according to claim 13 wherein said host material is comprised of an inorganic glass.

27. A laser component according to claim 26 wherein said inorganic glass is a silicate glass.

28. A laser component according to claim 26 wherein said inorganic glass is selected from a group consisting of barium crown glass, soda-lime silicate glass, flint glass, lead silicate glass, sodium borate glasses, high silica borosilicate glass, germanate glasses, aluminum zinc phosphate glasses, beryllium fluoride glass, silicate glasses, and arsenic trisulfide glass.

29. A laser component according to claim 13 wherein said host material is comprised of an organic glass.

30. A laser component according to claim 3 wherein said organic glass is selected from a group consisting of a methyl methacrylate organic glass, an acrylic organic glass, a vinyl chloride organic glass, glycerine, and ether-isopentane-alcohol.

31. A laser component according to claim 13 wherein said host material is a silicate glass.

32. A laser component according to claim 23 wherein said host material comprises a glassy material selected from a group consisting of barium crown glass, soda-lime silicate glass, flint glass, lead silicate glass, sodium borate glasses, high silica borosilicate glass, germanate glasses, aluminum zinc phosphate glasses, beryllium fluoride glass, silicate glasses, arsenic trisulfide glass, a methyl methacrylate organic glass, an acrylic organic glass, a vinyl chloride organic glass, glycerine, and ether-isopentane-alcohol.

33. A laser component according to claim 13 wherein said component is at least partially surrounded by a cladding material having an index of refraction different from that of said component.

34. A laser component according to claim 24 wherein said component is at least partially surrounded by a cladding material having an index of refraction different from that of said component.

35. A laser device comprising a laser component having a structure providing a wave propagation path, all surfaces of said component in said wave propagation path having total scattering of sufficiently low value to permit light energy by stimulated emission in excess of all light energy losses and at least a portion of a surface of said structure in said propagation path being at least partially transmissive of laser emissive light, said component comprising a glassy host material containing a quantity of a fluorescent ingredient which, in relation to the prevailing laser emissive light absorptive characteristics of said host material, supports in said host material a sufficient inversion in population between two energy levels of said fluorescent ingredient as to provide, at the wavelength of stimulated emission of said fluorescent ingredient, light energy by stimulated emission in excess of all light energy losses in said device, and a source of pumping energy directed into said component for establishing said population inversion.

36. A laser device according to claim 35 wherein a surface in said propagation path is at least partially reflecting of laser emissive light.

37. A laser device according to claim 35 wherein said component is comprised of an elongated core and a cladding material of a refractive index different from that of said core, said clad core having spaced helical turns surrounding said source of pumping energy.

38. A laser device according to claim 35 wherein said structure comprises two surfaces, spaced from one another along said path, and providing reflective and at least partially reflective end terminations for said propagation path.

39. A laser device according to claim 36 wherein said component is comprised of a plurality of substantially parallel laser emissive elements.

40. A laser device according to claim 39 wherein said elements are clad fibers in bunched relation to each other.

41. A laserable glassy material according to claim 3 wherein said host material is comprised of an inorganic glass.

42. A laser component according to claim 23 wherein said host material is comprised of an inorganic glass.

* * * * *